US012686487B2

(12) United States Patent
Galera Cordoba et al.

(10) Patent No.: US 12,686,487 B2
(45) Date of Patent: Jul. 21, 2026

(54) METHOD FOR APPLYING A COVER TO AN AIRCRAFT WING AND AIRCRAFT WING OBTAINED BY SAID METHOD

(71) Applicant: Airbus Operations S.L.U., Getafe (ES)

(72) Inventors: Georgina Galera Cordoba, Getafe (ES); Jose Maria Blanco Saiz, Getafe (ES); Pedro Nogueroles Viñes, Getafe (ES); Zulima Martin Moreno, Getafe (ES); Pablo Vazquez Sanchez, Getafe (ES); Antonio Torres Esteban, Getafe (ES); Oscar Bellido Fuentetaja, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 124 days.

(21) Appl. No.: 18/522,491

(22) Filed: Nov. 29, 2023

(65) Prior Publication Data

US 2024/0182153 A1      Jun. 6, 2024

(30) Foreign Application Priority Data

Dec. 1, 2022    (EP) ..................................... 22383167

(51) Int. Cl.
| | |
|---|---|
| *B64C 1/14* | (2006.01) |
| *B29C 65/02* | (2006.01) |
| *B64F 5/10* | (2017.01) |
| *F16J 15/10* | (2006.01) |
| *B64C 3/34* | (2006.01) |

(52) U.S. Cl.
CPC ............ *B64C 1/1446* (2013.01); *B29C 65/02* (2013.01); *B64F 5/10* (2017.01); *F16J 15/10* (2013.01); *B64C 3/34* (2013.01)

(58) Field of Classification Search
CPC ................................ B64C 1/1446; B64C 3/34
See application file for complete search history.

(56) References Cited

U.S. PATENT DOCUMENTS

| | | | |
|---|---|---|---|
| 9,926,085 B2 | 3/2018 | Blanco Pacios et al. | |
| 11,378,186 B1 * | 7/2022 | Boyd ...................... B29C 70/10 |
| 2006/0186606 A1 | 8/2006 | Schulz | |
| 2009/0294591 A1 | 12/2009 | Ramirez Blanco et al. | |

(Continued)

FOREIGN PATENT DOCUMENTS

EP          1614942 B1      8/2009

OTHER PUBLICATIONS

Patterson et al. "Manufacturing of a composite wing with internal structure in one cure cycle." Composite Structures vol. 206, Dec. 15, 2018, pp. 601-609.*

(Continued)

*Primary Examiner* — Christopher T Schatz
(74) *Attorney, Agent, or Firm* — Greer, Burns & Crain, Ltd.

(57)          ABSTRACT

A method for applying a cover to an aircraft wing including placing a skin provided with one or more manholes on the aircraft wing; placing a gasket for the, or each, manhole of the skin; placing a plug in the, or each, manhole; and curing the aircraft wing with the cover, the cover comprising the skin, the gasket or gaskets and the plug or plugs. The aircraft wing includes a cover applied by the described method including a skin, one or more gaskets and one or more plugs.

11 Claims, 1 Drawing Sheet

(56)  References Cited

U.S. PATENT DOCUMENTS

| | | | |
|---|---|---|---|
| 2012/0091269 A1 | 4/2012 | López-Reina Torrijos et al. | |
| 2013/0232883 A1* | 9/2013 | Tanner ..................... | E04C 2/54 |
| | | | 49/506 |
| 2013/0316147 A1* | 11/2013 | Douglas ................. | B64C 3/182 |
| | | | 156/60 |
| 2019/0153174 A1* | 5/2019 | Leegstra ................. | C08K 7/14 |

OTHER PUBLICATIONS

European Search Report for corresponding European U.S. Appl. No. 22/383,167 dated Apr. 28, 2023; priority document.

* cited by examiner

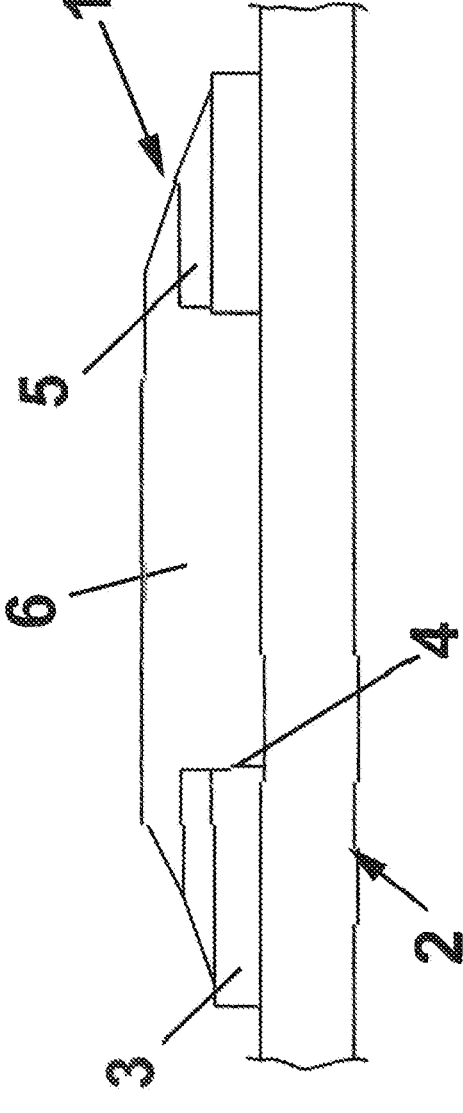

METHOD FOR APPLYING A COVER TO AN AIRCRAFT WING AND AIRCRAFT WING OBTAINED BY SAID METHOD

CROSS-REFERENCES TO RELATED APPLICATIONS

This application claims the benefit of the European patent application No. 22383167.8 filed on Dec. 1, 2022, the entire disclosures of which are incorporated herein by way of reference.

FIELD OF THE INVENTION

The present invention relates to a method for applying a cover to an aircraft wing, and to an aircraft wing obtained by this method, which reduces the application time, the recurrent costs and has a positive environmental footprint impact.

BACKGROUND OF THE INVENTION

The wings of aircraft comprise manhole areas which are covered by gaskets.

Manhole areas are intended to get maintenance accessibility. For fuel wing tank manholes, the closure is one of the main requirements to be met. This closure is obtained with a gasket, but this needs a supplement to fit properly to the wing on its inner face.

For example, the gasket is chemically glued to the wing, and each gasket has a different wing interface geometry depending on the manhole and the inner mold line designed surface.

Additionally, due to tight thickness tolerances and manufacturing variability, dedicated gasket geometries are required per each manufactured part.

The current method for applying the cover at the manhole area of an aircraft wing is as follows:

a wing cover skin is laid-up and cured;

gaskets are manufactured by a winding process with glass fiber material and they are cured in an autoclave;

the cover skin thickness is measured in the specific areas in which gaskets are going to be installed;

each gasket is milled according to the previous cover skin measurements;

each specific gasket is pre-installed in dry conditions in the specific wing and measured together to check to be in tolerance;

the gaskets are installed manually on the cover skin;

the quality thickness is measured;

if the measurements are out of tolerance range, a repair must be performed, the gasket must be removed, the area must be cleaned, the gasket must be reworked, e.g., sanded, for achieving the adequate thickness and reinstalled.

Therefore, this prior art method is time consuming because the gaskets are installed manually one by one.

SUMMARY OF THE INVENTION

Therefore, an objective of the present invention is to provide a method for applying a cover to an aircraft wing, and an aircraft wing obtained by the method which reduces the application time, the recurrent costs and has a positive environmental footprint impact.

The method for applying a cover to an aircraft wing comprises the following steps:

placing a skin provided with one or more manholes on the aircraft wing;

placing a gasket for the or each manhole of the skin;

placing a plug in the or each manhole; and curing the aircraft wing with the cover, the cover comprising the skin, the gasket or gaskets and the plug or plugs.

Preferably, the curing is made in an autoclave.

According to a preferred embodiment, the, or each, gasket, preferably with a continuous thickness, is made from a thermoplastic material, e.g., from recycled polyamide, by injection, and can comprise carbon fiber.

Furthermore, the thickness of the, or each, plug is preferably adapted according to the thickness of the cover.

According to a second aspect, the present invention also refers to an aircraft wing that is obtained by the method as described previously, wherein the aircraft wing comprises a cover including a skin, one or more gaskets and one or more plugs.

Furthermore, the method and the aircraft wing according to the present invention provides the following advantages, among others:

A highly integrated manhole area, including the gaskets and the wing cover, solves the high variability and customization needed in the manufacturing method to meet the tight thickness requirements.

It also prevents a high number of repairs due to thickness measurements being out of tolerance. Additionally, the method according to the present invention avoids the use of sealants needed to bond the gasket to the wing.

Furthermore, the method according to the present invention reduces the workload and the manufacturing lead time.

The following steps of the conventional methods are intended to be reduced, improved, or eliminated:

Dedicated gaskets manufacturing method, i.e., a winding method, would be superseded, e.g., by thermoplastic injection;

Closed lifecycle material used for gaskets injection;

Elimination of dedicated measurements and steps, such as milling, pre-installation, bonding, and thickness measurement.

BRIEF DESCRIPTION OF THE DRAWINGS

For better understanding of what has been disclosed, some drawings in which, schematically and only by way of a non-limiting example, a practical case of embodiment is shown.

The FIGURE is a sectional view of a portion of an aircraft wing with a cover applied, according to the present invention.

DETAILED DESCRIPTION OF THE PREFERRED EMBODIMENTS

As shown in the FIGURE, a cover 1 that is applied to an aircraft wing 2 comprises a skin 3 provided with one or manholes 4, a gasket 5 for each manhole 4 and a plug 6 for each manhole 4.

The, or each, gasket 5 is preferably made from a thermoplastic material, e.g., from recycled polyamide, by injection, and has a continuous thickness.

Furthermore, the thickness of the, or each, plug 6 is preferably adapted according to the thickness of the cover 1, providing therefore a thickness control.

The method for applying the cover 1 to the aircraft wing 2 comprises the following steps.

Firstly, the skin 3 provided with one or more manholes 4 is placed on the aircraft wing 2.

Then, a gasket 5 is placed for the, or each, manhole 4 of the skin 3, i.e., the gasket 5 is placed around each manhole 4, and a plug 6 is placed in the, or each, manhole 4, i.e., inside the, or each, manhole 4.

Finally, the whole aircraft wing 2 with the cover are cured at once, e.g., in an autoclave.

The use of gaskets 5, preferably made from recycled polyamide by injection coming from recycled ancillary materials with the possibility improves compatibility, thermal stability, and adhesion to the wing 2, which is made of carbon composite.

The manufacturing by injection allows surface customization of the gaskets 5 to increase the mechanical joint with the composite material and avoid surface preparation, such as sanding.

Furthermore, the joint curing of the cover 1 and the wing 2 at once in a single cycle avoids the use of adhesive and a second secondary bonding process.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for applying a cover to an aircraft wing, comprising the following steps: placing a skin provided with one or more manholes on the aircraft wing; placing a gasket for the, or each, manhole of the skin in direct contact with the skin; placing a plug in the, or each, manhole, wherein the, or each, plug has a head which contacts an upper surface of the, or each, gasket and a post below the head which is disposed within an opening of the, or each, gasket and an opening of the skin, wherein a thickness of the post is equal to a combined thickness of the, or each, gasket and the skin; and co-curing the aircraft wing together with the cover, the cover comprising the skin, the one or more gaskets and the one or more plugs.

2. The method for applying a cover to an aircraft wing according to claim 1, wherein the curing is made in an autoclave.

3. The method for applying a cover to an aircraft wing according to claim 1, wherein the, or each, gasket is made from a thermoplastic material.

4. The method for applying a cover to an aircraft wing according to claim 3, wherein the, or each, gasket is made from recycled polyamide.

5. The method for applying a cover to an aircraft wing according to claim 3, wherein the, or each, gasket is made by injection.

6. The method for applying a cover to an aircraft wing according to claim 1, wherein a thickness of the, or each, plug is selected according to a thickness of the cover.

7. An aircraft wing obtained by the method according to claim 1, wherein the aircraft wing comprises the cover including the skin, the one or more gaskets and the one or more plugs.

8. The aircraft wing according to claim 7, wherein the, or each, gasket has a continuous thickness.

9. The aircraft wing according to claim 7, wherein the, or each, gasket is made from a thermoplastic material.

10. The aircraft wing according to claim 9, wherein the, or each, gasket is made from recycled polyamide.

11. The aircraft wing according to claim 7, wherein the, or each, gasket comprises carbon fiber.

* * * * *